United States Patent
Shen et al.

(10) Patent No.: US 12,141,583 B2
(45) Date of Patent: Nov. 12, 2024

(54) REGISTER REORGANISATION BY CHANGING A MAPPING BETWEEN LOGICAL AND PHYSICAL REGISTERS BASED ON UPCOMING OPERATIONS AND AN INCOMPLETE SET OF CONNECTIONS BETWEEN THE PHYSICAL REGISTERS AND EXECUTION UNITS

(71) Applicant: Arm Limited, Cambridge (GB)

(72) Inventors: Xiaoyang Shen, Valbonne (FR); Zichao Xie, Cambourne (GB)

(73) Assignee: Arm Limited, Cambridge (GB)

( * ) Notice: Subject to any disclaimer, the term of this patent is extended or adjusted under 35 U.S.C. 154(b) by 121 days.

(21) Appl. No.: 17/943,407

(22) Filed: Sep. 13, 2022

(65) Prior Publication Data
US 2024/0086198 A1    Mar. 14, 2024

(51) Int. Cl.
*G06F 9/38*    (2018.01)
*G06F 9/30*    (2018.01)

(52) U.S. Cl.
CPC .......... *G06F 9/384* (2013.01); *G06F 9/3012* (2013.01); *G06F 9/3891* (2013.01)

(58) Field of Classification Search
CPC ...... G06F 9/384; G06F 9/3891; G06F 9/3012; G06F 9/30098; G06F 9/30141
See application file for complete search history.

(56) References Cited

U.S. PATENT DOCUMENTS

| | | | | |
|---|---|---|---|---|
| 6,094,716 A * | 7/2000 | Witt | ........................ | G06F 9/322 712/E9.034 |
| 6,167,503 A * | 12/2000 | Jouppi | ................... | G06F 9/3858 712/E9.046 |
| 6,629,232 B1 * | 9/2003 | Arora | ................... | G06F 9/30141 712/E9.071 |
| 6,704,855 B1 * | 3/2004 | Altman | ................. | G06F 9/3853 712/E9.046 |
| 6,757,807 B1 * | 6/2004 | Jacobson | .............. | G06F 9/3826 712/34 |
| 2003/0167388 A1 * | 9/2003 | Moudgill | ............... | G06F 9/3012 712/217 |
| 2005/0144424 A1 * | 6/2005 | De Vries | ............... | G06F 9/3885 712/225 |

(Continued)

*Primary Examiner* — Keith E Vicary
(74) *Attorney, Agent, or Firm* — NIXON & VANDERHYE P.C.

(57) ABSTRACT

An apparatus has processing circuitry with execution units to perform operations, physical registers to store data, and forwarding circuitry to forward the data from the physical registers to the execution units. The forwarding circuitry provides an incomplete set of connections between the physical registers and the execution units such that, for each of at least some of the physical registers, the physical register is connected to only a subset of the execution units. The apparatus also has register renaming circuitry to map logical registers identified by the operations to respective physical registers and register reorganisation circuitry to monitor upcoming operations and to determine, based on the upcoming operations and the connections provided by the forwarding circuitry, whether to perform a register reorganisation procedure to change a mapping between the logical registers and the physical registers. The register reorganisation circuitry is also configured to perform the register reorganisation procedure.

20 Claims, 8 Drawing Sheets

(56) References Cited

U.S. PATENT DOCUMENTS

| | | | | |
|---|---|---|---|---|
| 2005/0210219 A1* | 9/2005 | Bekooij | ............... | G06F 9/3824 |
| | | | | 712/E9.046 |
| 2005/0262270 A1* | 11/2005 | Latorre | ................... | G06F 1/32 |
| | | | | 710/1 |
| 2006/0037010 A1* | 2/2006 | Willoughby | ............ | G06F 8/441 |
| | | | | 712/E9.082 |
| 2008/0162898 A1* | 7/2008 | Gschwind | ............. | G06F 9/3885 |
| | | | | 712/225 |
| 2016/0357561 A1* | 12/2016 | Greenhalgh | ........ | G06F 9/30101 |
| 2018/0150297 A1* | 5/2018 | Batley | ................... | G06F 1/3287 |
| 2019/0377706 A1* | 12/2019 | Airaud | ................. | G06F 9/3891 |
| 2020/0065109 A1* | 2/2020 | Shen | .................. | G06F 9/30036 |
| 2023/0305852 A1* | 9/2023 | Asanovic | ............. | G06F 9/3013 |

\* cited by examiner

Ex:
SMLALL ZA.S[W8, 0:3, VGx2], {Z0.B, Z1.B}, Z2.B

REGISTER REORGANISATION BY CHANGING A MAPPING BETWEEN LOGICAL AND PHYSICAL REGISTERS BASED ON UPCOMING OPERATIONS AND AN INCOMPLETE SET OF CONNECTIONS BETWEEN THE PHYSICAL REGISTERS AND EXECUTION UNITS

BACKGROUND

The present technique relates to the field of data processing. More particularly, the present technique relates to changing a mapping between logical and physical registers.

A processor may have a plurality of execution units to perform operations and a bank of registers to store data used to perform those operations. The execution units can then reference the registers to obtain the data needed to carry out the operations. Matrix processors in particular may have a large number of execution units, each arranged to perform processing on a particular element or elements of matrix or vector inputs. By providing more execution units, the processor may be able to carry out more operations at the same time. Thus, for performance reasons, it is often desirable to provide a large number of execution units.

SUMMARY

In one example arrangement, there is provided an apparatus comprising: processing circuitry comprising at least two execution units configured to perform operations; a plurality of physical registers to store data accessed by the execution units to perform the operations; forwarding circuitry to forward the data from the physical registers to the execution units, wherein the forwarding circuitry provides an incomplete set of connections between the physical registers and the execution units such that, for each of at least some of the physical registers, the physical register is connected to only a subset of the execution units; register renaming circuitry to map logical registers identified by the operations to respective physical registers of the plurality of physical registers; and register reorganisation circuitry configured to monitor upcoming operations to be performed by the processing circuitry and to determine, based on the upcoming operations and the connections provided by the forwarding circuitry, whether to perform a register reorganisation procedure to change a mapping between the logical registers and the physical registers used by the register renaming circuitry; wherein the register reorganisation circuitry is configured to perform, in response to determining to perform the register reorganisation procedure, the register reorganisation procedure.

In another example arrangement, there is provided a method comprising: performing, by processing circuitry comprising at least two execution units, operations; storing, by a plurality of physical registers, data accessed by the execution units to perform the operations; forwarding the data from the physical registers to the execution units over an incomplete set of connections between the physical registers and the execution units such that, for each of at least some of the physical registers, the physical register is connected to only a subset of the execution units; mapping logical registers identified by the operations to respective physical registers of the plurality of physical registers; and monitoring upcoming operations to be performed by the processing circuitry and determining, based on the upcoming operations whether to perform a register reorganisation procedure to change a mapping between the logical registers and the physical registers; performing, in response to determining to perform the register reorganisation procedure, the register reorganisation procedure.

In a yet further example arrangement, there is provided a non-transitory computer-readable medium to store computer-readable code for fabrication of an apparatus comprising: processing circuitry comprising at least two execution units configured to perform operations; a plurality of physical registers to store data accessed by the execution units to perform the operations; forwarding circuitry to forward the data from the physical registers to the execution units, wherein the forwarding circuitry provides an incomplete set of connections between the physical registers and the execution units such that, for each of at least some of the physical registers, the physical register is connected to only a subset of the execution units; register renaming circuitry to map logical registers identified by the operations to respective physical registers of the plurality of physical registers; and register reorganisation circuitry configured to monitor upcoming operations to be performed by the processing circuitry and to determine, based on the upcoming operations and the connections provided by the forwarding circuitry, whether to perform a register reorganisation procedure to change a mapping between the logical registers and the physical registers used by the register renaming circuitry; wherein the register reorganisation circuitry is configured to perform, in response to determining to perform the register reorganisation procedure, the register reorganisation procedure.

BRIEF DESCRIPTION OF THE DRAWINGS

Further aspects, features, and advantages of the present technique will be apparent from the following description of examples, which is to be read in conjunction with the accompanying drawings, in which.

DESCRIPTION OF EXAMPLES

Figure 1:
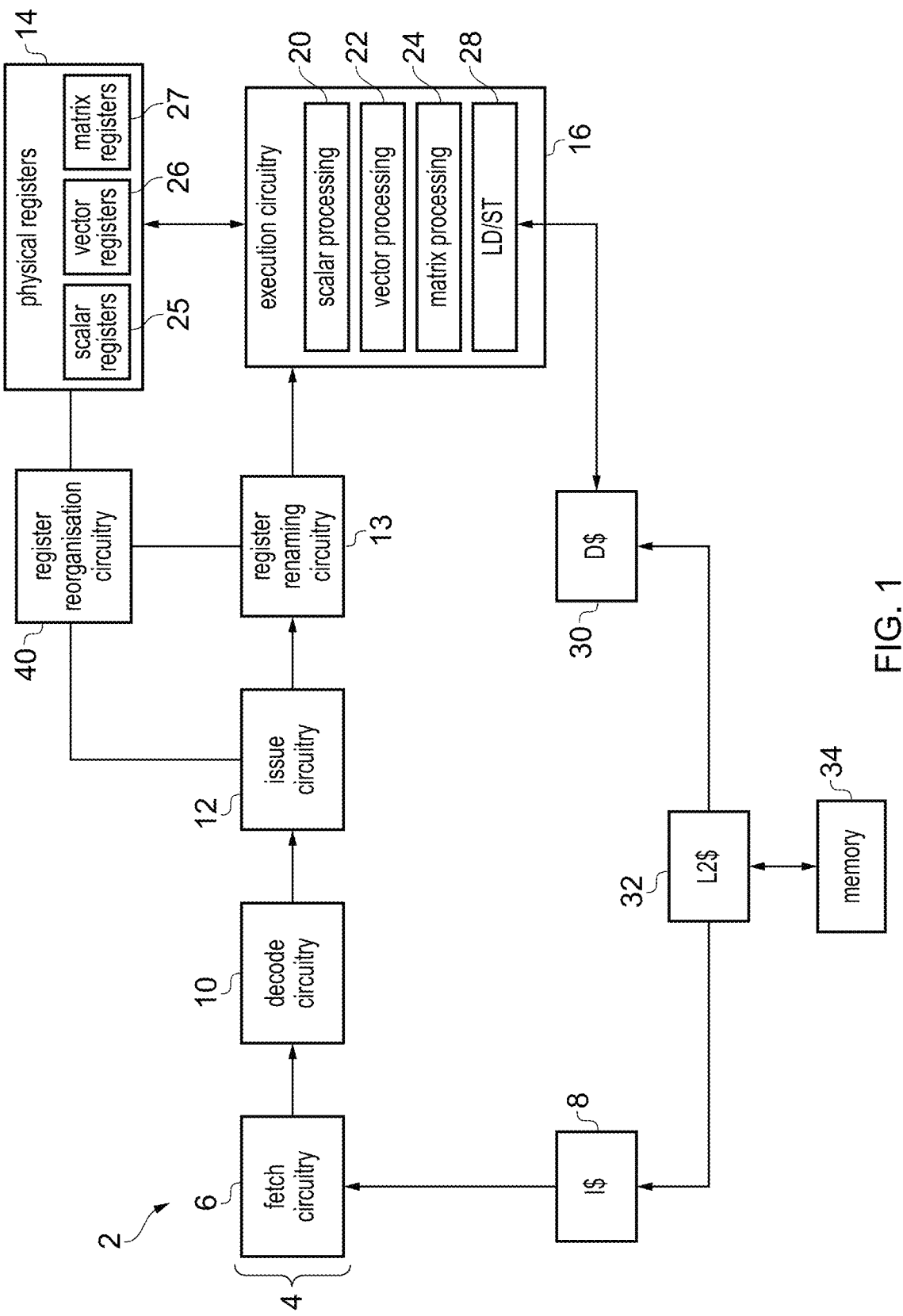
FIG. 1 schematically illustrates an apparatus according to an example.

Before discussing the embodiments with reference to the accompanying figures, the following description of embodiments is provided.

An apparatus may be provided with multiple execution units and multiple registers; however, rather than providing connections from each execution unit to each register (which may be termed a full or complete set of connections between the registers and the execution units) an incomplete set of connections may be provided such that each register is connected to only some, and not all, of the execution units. In cases where the number of execution units is large, the number of connections that would need to be provided to connect each register with each execution unit may become very large. With each connection occupying area of the processor and potentially consuming power, instead of providing a complete set of paths, an incomplete set of connections may be provided such that each register is (or more generally, at least some of the registers are) connected to only a subset of the execution units. While this constrains the forwarding possibilities between the registers and the execution units, the set of connections provided may be selected to provide enough connections to be suitable for at least some workloads likely to be encountered by the processor.

For example, in a matrix processor, outer product operations are typically those which have the highest requirement on execution bandwidth. Therefore, to ensure that when executing outer product operations, as many of the available execution units can be used as possible, a set of connections may be provided that is optimised for calculating outer products. That is, the set of connections, while incomplete, may allow elements of vector operands of an outer product operation to be passed to the execution units in such a way that the full set of execution units may be used to perform the outer product operation. Hence, the apparatus is able to make use of the full bandwidth of the matrix processor for these types of workload.

However, this set of connections may not be optimised for other forms of calculation handled by the processing circuitry. For such calculations, even where the apparatus has enough execution units to handle all of the operations involved in performing the calculation at the same time, the registers and execution units may not be provided with the connections that would allow the data items to be transferred to the full bank of execution units for processing. Although the apparatus could be provided with connections that support efficient execution of these other calculations, due to the different forwarding requirements of different types of calculation, such a set of connections may not allow for maximum performance of the outer product calculation (or further forms of calculation).

Consequently, given the large number of possible connections that could be provided between the registers and the execution units and the different forwarding requirements of different types of calculation, it may be very difficult or even impossible to provide a set of connections that enables all of the types of calculation supported by the processing circuitry to be executed in an efficient manner.

Where a set of connections that allows for all of the execution units is not available, the apparatus may carry out the calculation by splitting the calculation into separate micro-operations. This approach however slows down the execution of the calculation as each micro-operation may need to be started on different clock cycles. The lack of available connections can thus have a performance impact on the processor even where enough execution units are provided in the processing circuitry to handle all of the operations at the same time.

In accordance with the techniques described herein, register reorganisation circuitry is employed to change a mapping between logical registers (also known as architectural registers) referred to by the operations and the physical registers storing the data. The register reorganisation circuitry identifies where a different mapping between logical and physical registers would allow the data used in the operations to be distributed between physical registers in such a way that, given the available connections between physical registers and execution units, the processing circuitry is able to make better use of the execution units.

For example, the register reorganisation circuitry may identify that an upcoming operation will need to be split into two micro-operations in order to execute. This may be based on the arrangement of connections between the execution units and the physical registers that are currently mapped to the logical registers identified by the operation. However, by changing the mapping between the logical registers and physical registers, physical registers may be used that are connected to the execution units in such a way that more efficient use may be made of the processing circuitry and thereby enable the operation to be executed as a single micro-operation.

Thus, in accordance with the techniques described herein, there is therefore provided an apparatus with processing circuitry that comprises one or more execution units that perform operations in response to instructions. The processing circuitry may comprise a central processing unit (CPU) or graphics processing unit (GPU) or parts thereof. In particular, the processing circuitry may comprise an arithmetic logic unit (ALU) or floating point unit (FPU) as may be found in a CPU or GPU. The processing circuitry may in some examples be vector processing circuitry or matrix processing circuitry arranged to operate on and output vectors and matrices respectively or may in some examples be a scalar processor. The execution units may represent elements of the processing circuitry arranged to perform specific types of operation. For example, the execution units could be an arithmetic logic unit (ALU) or a floating point unit (FPU) or sub-units thereof. In some examples, the execution units are functional units of a matrix processor with each execution unit arranged to operate on a particular element or elements of one or more matrix or vector inputs.

The apparatus is further provided with one or more physical registers to store data accessed by the processing circuitry. Such registers may be scalar registers arranged to store scalar values or may be vector or matrix registers comprising multiple elements to store vector or matrix data. The one or more physical registers are in communication with the processing circuitry such that results can be written from the processing circuitry to the registers and read from the physical registers by the processing circuitry in order to carry out operations on the data stored in those registers.

As used herein, the term "physical registers" refers to the hardware registers provided as part of the apparatus as may for example be implemented with circuitry. These physical registers are thus distinct from logical registers (or architectural registers) identified by instructions or operations executed by the processing circuitry.

To map the logical registers specified by the operations to physical registers of the apparatus, register renaming circuitry is provided. The register renaming circuitry is responsive to an instruction, operation, or micro-operation referencing a logical register to replace the reference to the logical register with a reference to a physical register. In an out-of-order processor, the register renaming circuitry may also perform dependency checking functionality to identify dependencies between instructions. The register renaming circuitry may map logical registers to physical registers on the basis of such dependencies to ensure that instructions that are dependent on one another do make use of the same physical register while allowing operations that are not dependent on each other to make use of separate physical registers e.g., to enable parallel execution/reordering of execution.

The register remaining circuitry may in some examples maintain register renaming information indicative of a mapping between logical and physical registers. The register renaming circuitry is arranged to reference the register renaming information to determine how the logical registers referred to by the operations should be mapped to physical registers.

As used herein, the term 'operation' refers to a calculation or element of processing that is performed by the execution unit. The precise form that the operation takes may depend on the apparatus, the processing circuitry or the execution unit handling the operation. In some examples, the operations will correspond directly to instructions being executed by the processing circuitry such that each instruction is an operation. However, in some examples, the operations referred to herein correspond to micro-operations generated by decode circuitry of the apparatus. If the micro-operations are further divided or combined, the operations may correspond more generally to whichever tasks are handled by the execution units. Where a matrix processor is used, the operations may correspond to the individual calculations performed by each execution element of the matrix processor.

To support forwarding of results from the physical registers to the execution units and/or forwarding of results from the execution units to the physical registers to be written-back, there is also provided forwarding circuitry. The forwarding circuitry provides a set of connections between the physical registers and the execution units along which data can be forwarded. Providing a complete set of connections between the registers and the execution units may require a very large number of connections, occupying valuable area of the processor, consuming power, and requiring additional forwarding logic to manage. Instead, in accordance with the techniques described herein, the forwarding circuitry is provided with an incomplete set of connections such that for at least some of the physical registers, that physical register is connected to only a subset (i.e., not all) of the execution units.

In some examples, the set of connections that is provided is a set of connections optimised for executing a particular type of operation. That is, the set of connections may be chosen to allow efficient execution of that type of operation or workload, e.g., a workload that is expected to be executed often or a workload requiring a particularly high execution bandwidth.

For example, and particularly where the processing circuitry comprises a matrix processor, the particular type of operation may be an outer product operation between two vectors. The outer product operation in particular has a high execution bandwidth requirement and so, to ensure that as many of the execution units as possible can handle outer product calculations at the same time, connections may be provided between the registers and the execution units that enables as many of the execution units as possible to operate on the outer product calculation.

However, this set of connections may not be optimised for other forms of workload that may have a lower overall execution bandwidth requirement. However, while having a lower overall bandwidth requirement, the execution unit bandwidth for these operations may not be distributed evenly across the execution units. Thus, for such other types of operation, even though enough execution units may be provided to handle the operation as a single micro-operation, the requisite connections to provide data to all of the execution units may not be provided. As such, those types of operation may need to be split into more than one micro-operation to be executed separately.

In accordance with the techniques described herein, there is therefore provided register reorganisation circuitry to selectively adjust the mapping between the logical and physical registers to enable efficient use of the execution units and the connections provided. By adjusting the mapping, the register reorganisation circuitry can allow physical registers to be used that have connections to execution units that will allow efficient use of the execution units to be made. For example, where the register reorganisation circuitry identifies that, with a current mapping, all or a large number of the operations to handle a particular calculation make use of logical registers mapped to physical registers that are associated with a small number of execution units, the register reorganisation circuitry may identify that better use of the execution units can be made by remapping the logical registers to a broader range of physical registers such that more of the execution units may be used to carry out the processing.

To monitor the upcoming operations to be performed by the processing circuitry, the register reorganisation circuitry may for example reference an issue queue containing upcoming instructions to be executed by processing circuitry. The issue queue may be implemented by issue circuitry that buffers the upcoming operations before they are issued for execution.

Thus, the register reorganisation circuitry is configured to monitor upcoming operations to be performed by the processing circuitry and to determine, based on the upcoming operations and the connections that are provided by the forwarding circuitry, whether and what sort of register reorganisation procedure could be performed to change the mapping. If the register reorganisation circuitry determines that the register reorganisation procedure should be performed, the register reorganisation may then perform that procedure to change the mapping.

The new mapping may be determined based on the characteristics of the upcoming operations and may in some examples be selected from a set of predetermined mappings. By selecting from a set of predetermined mappings, mappings tailored to particular workloads that are expected to be encountered may be provided to the apparatus in advance such that the register reorganisation circuitry only has to identify which of the sets of mappings is most appropriate and implement that mapping rather than having to derive a new set of mappings that will allow the operations to be executed efficiently each time.

A number of possible policies could be implemented by the register reorganisation circuitry to determine when to trigger the register reorganisation procedure. For example, the register reorganisation circuitry could identify for each upcoming operation, a mapping that would enable efficient execution of that operation and reorganise the registers according to that mapping. However, since a power/time cost will typically be associated with performing the remapping procedure, the register reorganisation circuitry may only perform the register reorganisation circuitry when it is determined that changing the mapping between the logical registers and physical registers would save power, and specifically may only perform the register reorganisation procedure where the power or time that is estimated as being saved is greater than the additional power consumed or time taken to perform the register reorganisation itself.

In some examples, the register reorganisation procedure may be performed to avoid an upcoming operation being split into two or more micro-operations. The register reorganisation circuitry may determine that this would otherwise occur based on identifying that the mapping currently being used prevents the execution units performing the upcoming operation as a single micro-operation, e.g., because the connections provided by the forwarding circuitry do not connect the physical registers currently mapped to the logical registers identified by the upcoming operation to execution units having sufficient bandwidth to execute the upcoming operation as a single micro-operation. In response, the register reorganisation circuitry may change the mapping used by the register renaming circuitry to a new mapping that enables the upcoming operation to be performed as a single micro-operation (e.g., by enabling more of the execution units to be used such that a bandwidth requirement of the operation can be met).

The register reorganisation circuitry may be arranged to ensure that when an operation can be executed using a single micro-operation if an appropriate mapping is selected, that such a mapping is used. More generally, the register reorganisation circuitry may be arranged to carry out the register reorganisation procedure any time that performing the register reorganisation procedure would allow a series of one or more operations to be executed in fewer cycles. Thus, the register reorganisation circuitry may be directly responsive to detecting the opportunity to avoid micro-operation split such that in every case in which this is detected, the register reorganisation procedure is performed.

In this way, the micro-operation split can be avoided where possible to do so and so the calculation handled in a more performant manner. Such an approach may be used on the basis that the increase in performance by avoiding a micro-operation split outweighs the cost of performing the register reorganisation procedure, even where only a single instance of micro-operation split is avoided.

In some examples, and particularly in cases where the processing circuitry comprises matrix processing circuitry, the execution units may be arranged in clusters with each cluster containing two or more execution units and some physical registers associated therewith. The physical registers and the execution units may then be connected such that the forwarding circuitry provides connections between the physical registers and the execution units belonging to the same cluster. Consequently, the mapping between logical registers and physical registers can dictate to which cluster an operation is allocated. If an operation reads from or writes to a particular logical register mapped to a physical register in a first cluster, the operation will be handled by an execution unit in that cluster whereas a second operation that reads from/writes to a logical register that is mapped to a physical register in a second cluster would be handled by an execution unit in that cluster. As such, by changing the mapping between logical registers and physical registers, the register reorganisation circuitry is able to change the cluster to which each operation is allocated. The register reorganisation circuitry may therefore perform the register reorganisation procedure to distribute operations to clusters having sufficient execution bandwidth (i.e., enough execution units) to handle the operations.

As discussed above, the register reorganisation circuitry may perform the register reorganisation in order to save power as well as to improve performance. As such, the register reorganisation circuitry may change the mapping any time that it is determined that changing the mapping would allow the power consumed in performing the operations to be reduced e.g., where it is determined that the power saved by changing the mapping exceeds a power consumption associated with performing the register reorganisation procedure itself.

One particular way in which the register reorganisation procedure may be used to save power is where input flops can be re-used to provide data to more than one execution unit at a time. In such examples, the processing circuitry may comprise input operand storage circuitry having one or more operand storage elements (which may be implemented using flops) for each execution unit. In some cases, execution units share operand storage elements with other execution units such that more than one execution unit is able to access the same operand storage element. If the operations being performed by the execution units can be arranged so that execution units that share operand storage elements are used to handle operations that make use of the same data, the number of operand storage elements that need to be used to provide the data to the execution units can be reduced. By extension, since fewer operand storage elements are used, the power consumed in operating the operand storage elements can be reduced.

Thus, the register reorganisation circuitry may be configured to perform the register reorganisation procedure in response to determining that the usage of the input operand storage circuitry can be reduced by using shared operand storage elements to store common items of data accessed by more than one execution unit. By changing the mapping between logical registers and physical registers, the register reorganisation circuitry can ensure that the data being accessed by more than one execution unit is stored in physical registers from which the shared operand storage elements can provide the data to those execution units.

In some examples, to determine whether to carry out the register reorganisation procedure, the register reorganisation circuitry may identify and track the number of consecutive operations handled by the processing circuitry for which an alternative mapping would be more efficient. The register reorganisation circuitry may for example maintain a counter that is incremented each time an operation that would benefit from the mapping between logical registers and physical registers being changed to a particular other mapping was observed. If an operation benefitting from the current mapping or from another different mapping was observed, the counter may be reset. Once the counter has reached a threshold value, the register reorganisation circuitry may be arranged to trigger the register reorganisation procedure. This may provide a way to balance the costs of performing the register reorganisation procedure, both in terms of the power consumed and the time taken to perform the procedure with the benefits that may be obtained by using a different mapping.

In some examples, this approach may be combined with a policy whereby any time that a micro-operation split can be avoided by performing the register reorganisation procedure, the procedure is performed since it may be determined that avoiding the micro-operation split is always or usually worth incurring the cost of the register reorganisation procedure.

To actually perform the register reorganisation procedure, the register reorganisation circuitry may be configured to halt upcoming operations so that the operations being executed by the processing circuitry can finish executing. That is, before adjusting the mapping between logical and physical registers, the register reorganisation circuitry allows the in-flight instructions being handled by the processing circuitry to finish executing since these instructions make use of the existing mapping. During this period, the operations that are to be executed using the new mapping are halted or stalled (e.g., by preventing issuance of those instructions from the issue queue).

Once the in-flight operations have finished executing, the register reorganisation circuitry can transfer data between the physical registers according to the new mapping that is to be used. In this way, the data in the registers can be structured to reflect the new mapping between physical and logical registers. Where the mapping is updated to indicate that a particular logical register is mapped to a new physical register, the data currently associated with that particular logical register may be transferred from the current physical register to the new physical register.

The register renaming circuitry may then update the mapping between logical registers and the respective physical registers to reflect the new mapping that is to be used. This may take place for example by updating a stored indication of the mapping referenced by the register renaming circuitry when carrying out register renaming With the register reorganisation procedure thus performed, the register reorganisation circuitry may then unstall the halted operations to allow the upcoming operations to be executed by the processing circuitry. The register renaming circuitry, operating according to the new mapping, will therefore map the logical registers referenced by the operations to physical registers according to the new mapping. The more efficient mapping selected for the upcoming workload can thus be employed.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 schematically illustrates an example of a data processing apparatus 2. The data processing apparatus has a processing pipeline 4 which includes a number of pipeline stages, each implemented by corresponding circuitry. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a physical register file 14 and issuing micro-operations for execution once the required operands for a given micro-operation are available; a register renaming stage 13 for mapping logical registers specified by program instructions or micro-operations to physical registers in the register file 14; and an execute stage 16 for executing data processing operations corresponding to the micro-operations by processing operands read from the register file 14 to generate result values. The result values can then be written-back to the register file 14. It will be appreciated that this is merely one example of a possible pipeline arrangement, and other systems may have additional stages or a different configuration of stages.

Register reorganisation circuitry 40 is provided to monitor the upcoming operations to be executed by the execution circuitry 16 and to identify where more efficient execution of the operations can be achieved using a different mapping between logical registers referenced by the operations (e.g., instructions) and the physical registers of the register file 14. Where a different mapping would lead to more efficient execution, the register reorganisation circuitry 40 may in some cases initiate a register reorganisation procedure to change the mapping used by the register renaming circuitry 13.

In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; a matrix processing unit 24 for performing matrix operations on vectors and matrices; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, and matrix registers 27 for storing matrix values.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline arrangement, and the processor may include many other elements not illustrated for conciseness.

Figure 2:
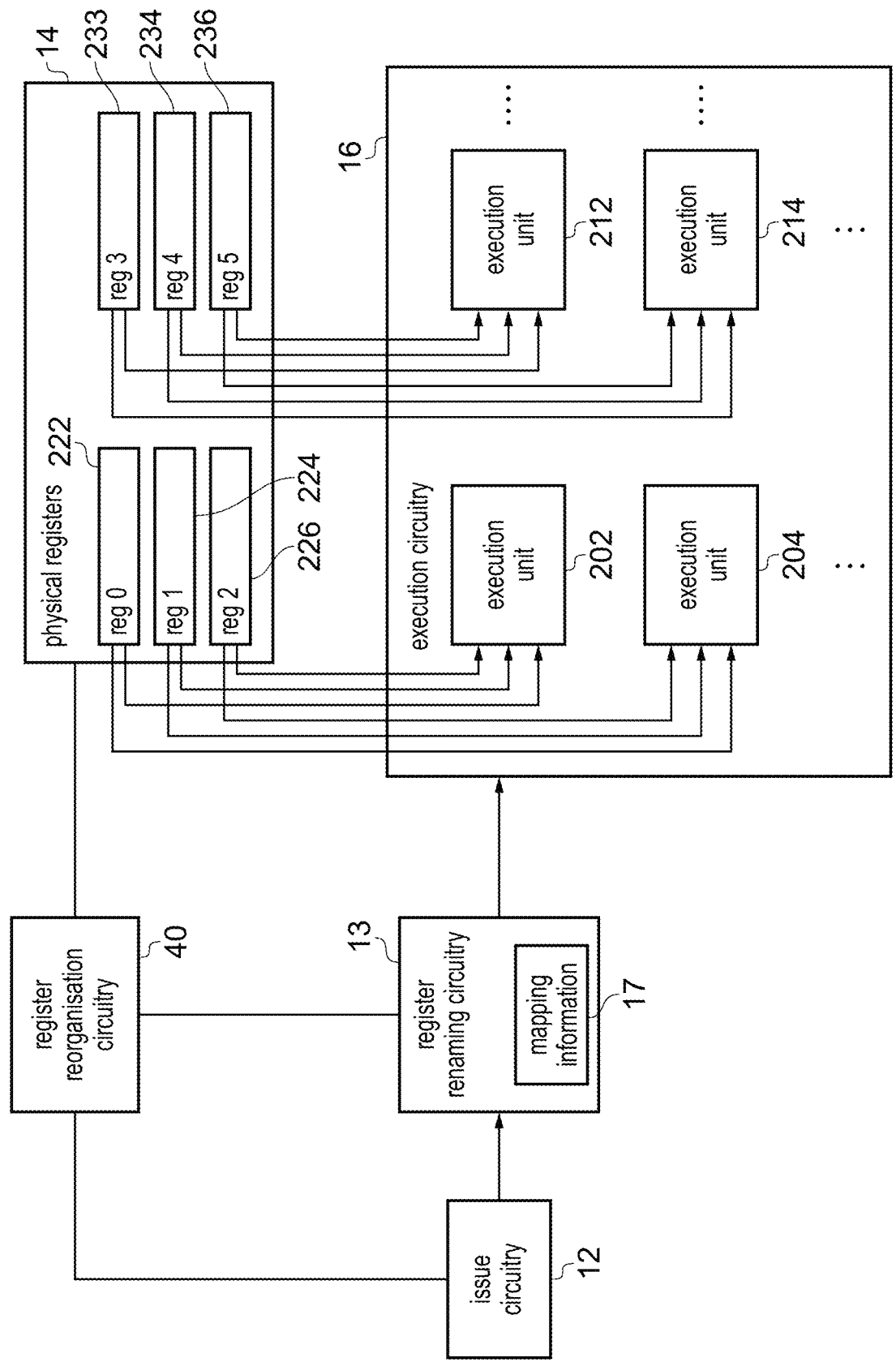
FIG. 2 is a more detailed schematic illustration of various components of the apparatus of FIG. 1 according to an example.

FIG. 2 is a more detailed schematic illustration of various components of the apparatus 2 of FIG. 1. FIG. 2 depicts issue circuitry 12 to buffer upcoming operations to be executed by the execution circuitry 16. Following the issue circuitry 12 is register renaming circuitry 13 to map the registers referred to by the instructions, which are logical registers and so do not correspond directly to circuitry in the apparatus 2, to physical registers 222-236 of the register file 14. In the example illustrated in FIG. 2, this is done by referencing mapping information 17 stored in mapping information storage circuitry which stores indications of the physical registers to which the architectural registers relate. FIG. 2 illustrates six physical registers 222-236 in the register file 14; however, it will be appreciated that more or fewer registers may be provided and with varying arrangements.

As illustrated in FIG. 2, the execution circuitry 16 comprises a number of execution units 202-214 which are able to carry out operations or elements of operations. Each execution unit is connected to a subset of the registers 222-236. That is, rather than each execution unit 202-214 being connected to each register, forwarding circuitry that implements these connections provides an incomplete set of connections. This means that, for example, execution unit 212 is not connected to registers reg0 222, reg1 224, or reg2 226 although execution unit 212 is connected to registers reg3-reg5 233-236. FIG. 2 only shows paths from the physical registers to the execution units and not from execution units back to the physical registers for writing-back results. In this example, it is assumed that where a path is provided from a physical register to an execution unit, a corresponding path from the execution unit back to the physical register is also provided, although in general this need not be the case.

Since not every execution unit is able to receive data from or write-back data to every physical register, the choice of physical registers used to store data to be operated on by the execution units 202-214 can influence which execution units 202-214 are available to carry out an operation making use of that data. For example, if data for a particular operation is stored in registers reg0 222, reg1 224, and reg2 226, the execution unit 212 could not be used to carry out the operation as that execution unit 212 is not connected to the registers storing the relevant data. If several operations were to be performed using the data stored in these registers, it is possible that the execution units 202-204 that are connected to those registers 222-226 will not have enough capacity to handle the operations at once. As such, the operation or instructions being executed may need to be split into two or more micro-operations in order to make use of the execution units 202-204 on separate cycles. This is despite the presence of execution units 212, 214 which could have provided additional bandwidth for execution had the requisite connections been provided.

However, in such cases, register reorganisation circuitry 40 may identify (e.g., by monitoring the issue circuitry 12) that such an occurrence is likely to happen and may adjust the mapping information 17 referenced by the register renaming circuitry 13 to allow for more efficient use of the execution units 202-214. By reorganising the registers in this way, the data used by these operations may be better distributed over the physical registers 222-236, for example, by making use of the physical registers reg3-reg5 233-236 in order to more efficiently use the other execution units 212-214. Thus, by adjusting the mapping used between logical and physical registers, the register reorganisation circuitry 40 may be able to make better use of the available processing capacity of the execution units and so prevent or reduce the incidence of micro-operation split.

The register reorganisation circuitry 40 may also for example perform the register reorganisation procedure to allow for re-use of input operand storage, as will be explained in relation to FIGS. 6A-6D.

It should be appreciated that the layout of physical registers and execution units in FIG. 2 represents only one example and other layouts with more or fewer registers and execution units and with different connections provided may be used.

Figure 3:
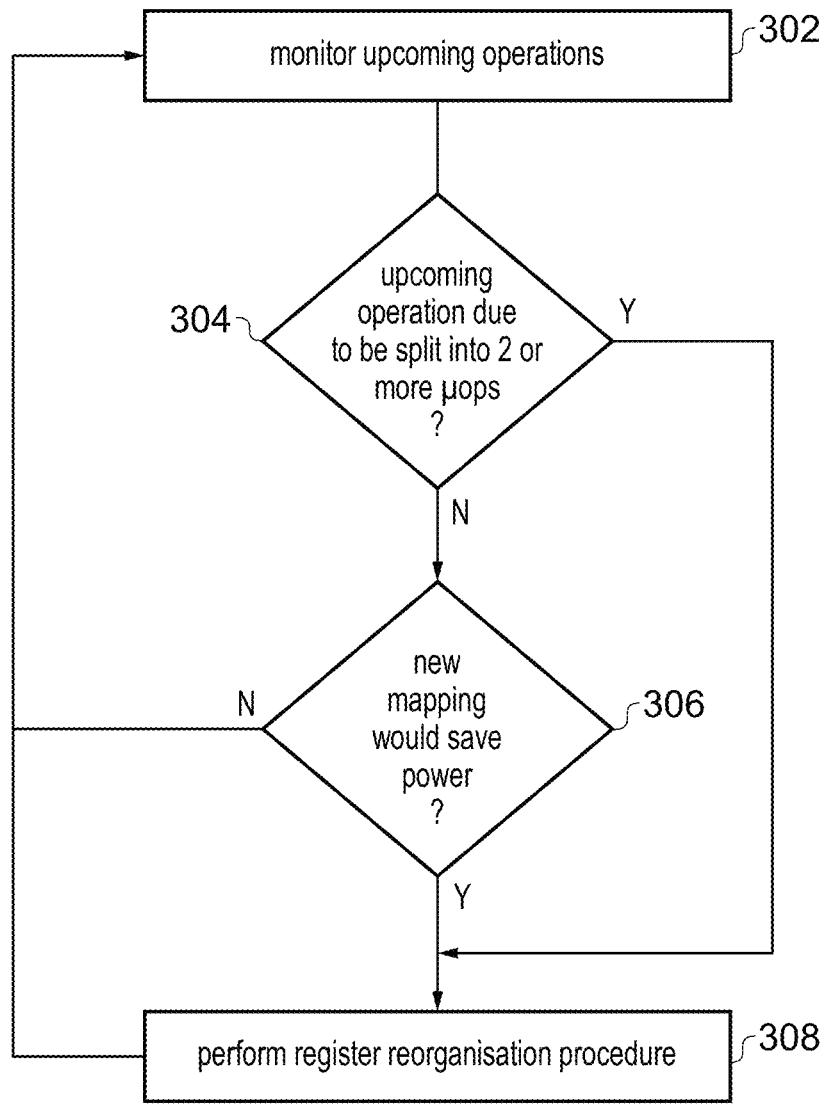
FIG. 3 is a flow diagram illustrating the operation of the register reorganisation circuitry according to an example.

FIG. 3 is a flow diagram illustrating the operation of the register reorganisation circuitry 40 according to an example. As illustrated in step 302, the register reorganisation circuitry 40 monitors upcoming operations, for example instructions in issue circuitry 12. The register reorganisation circuitry 40 looks to determine whether to perform a register reorganisation procedure at step 308. As shown in FIG. 3, this is done using step 304 to monitor whether an upcoming operation is due to be split into two or more micro-operations where it would be possible to execute the operation as a single micro-operation with a different mapping between logical and physical registers. If such an upcoming operation is detected, the register reorganisation circuitry 40 may trigger the register reorganisation procedure 308 to improve the performance when executing this operation.

The register reorganisation procedure may also be performed in response to identifying that a new mapping would save power at step 306. That is, if a new mapping could be used that it is predicted would consume less power in executing the upcoming operations, the register reorganisation procedure may be performed at step 308 to take advantage of this reduction in power consumption.

In any case, the flow proceeds to step 302 again at which the upcoming operations are monitored to determine whether to perform a (further) register reorganisation procedure.

Figure 4:
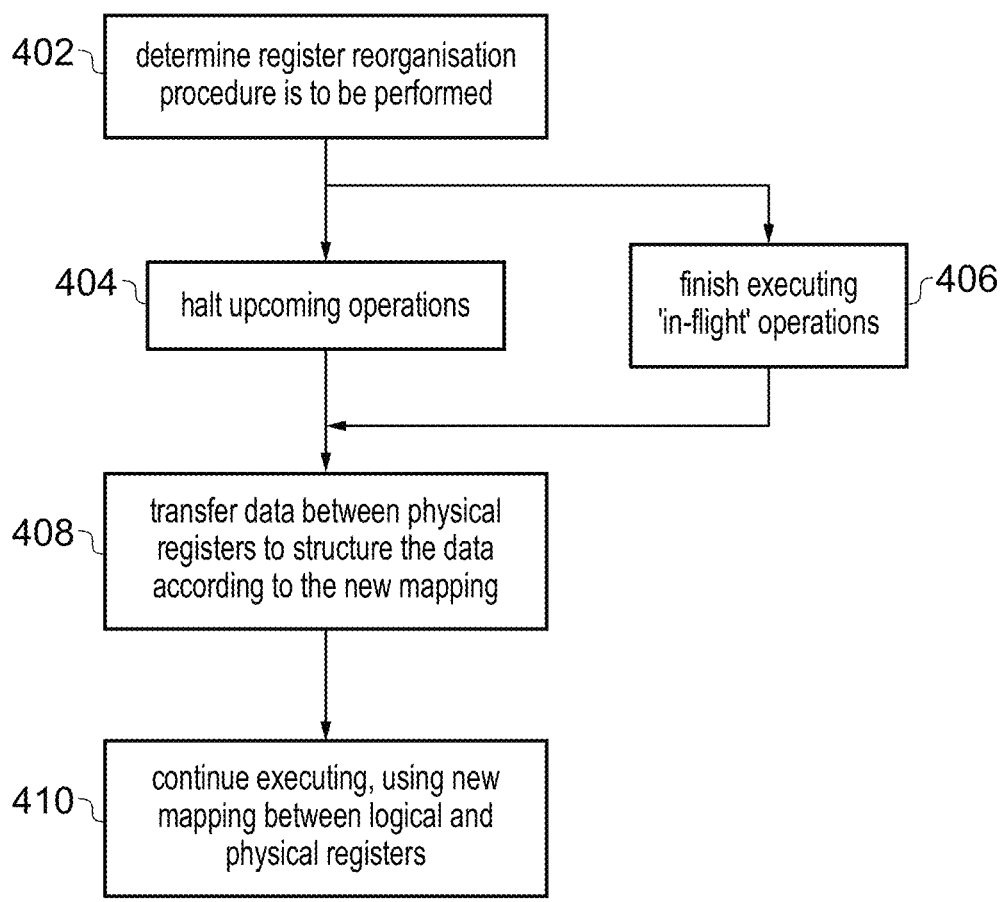
FIG. 4 is a flow diagram illustrating the register reorganisation procedure according to an example.

FIG. 4 is a flow diagram illustrating the register reorganisation procedure according to an example. At step 402, it is determined that the register reorganisation procedure is to be performed, for example using the method illustrated in FIG. 3.

Then at step 404, upcoming operations to be executed by the execution circuitry 16 are halted while 'in-flight' operations—operations that are already being handled by the execution circuitry 16 are allowed to finish executing at step 406 since these operations make use of the mapping to be replaced and to avoid the execution circuitry 16 executing operations that make use of different mappings at the same time.

The register reorganisation circuitry 40 then causes data stored in the physical registers to be transferred between the registers to reflect the new mapping at step 408. With the new mapping in place and the mapping information 17 updated to reflect the new mapping, the method proceeds to step 410 at which execution continues, using the new mapping.

Figure 5A:
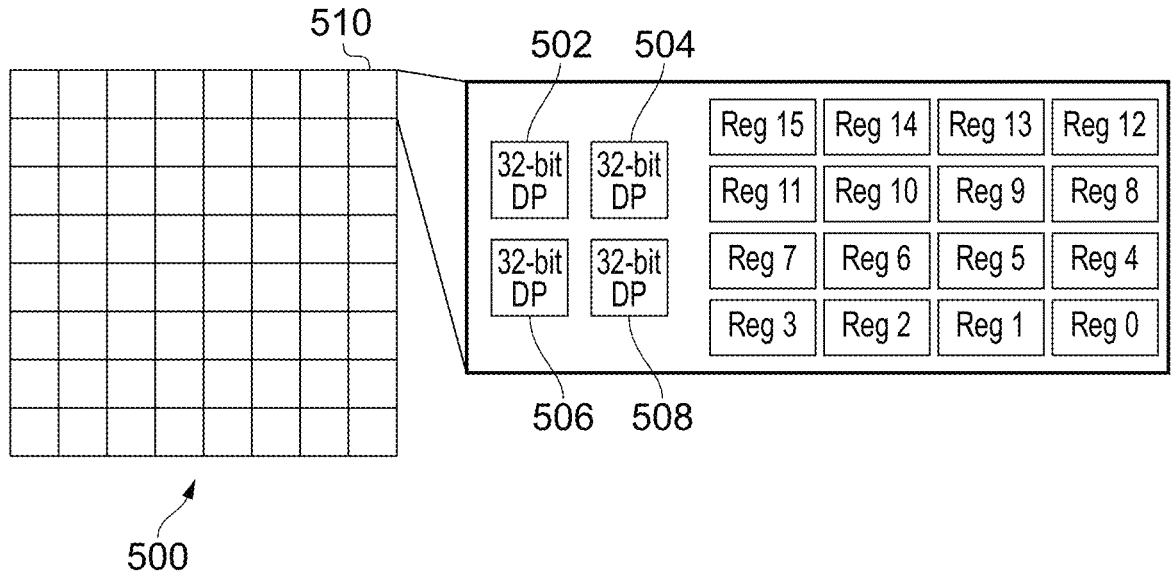
FIGS. 5A-5C illustrate a worked example where a register reorganisation procedure is performed to avoid micro-operation split.
Figure 5B:
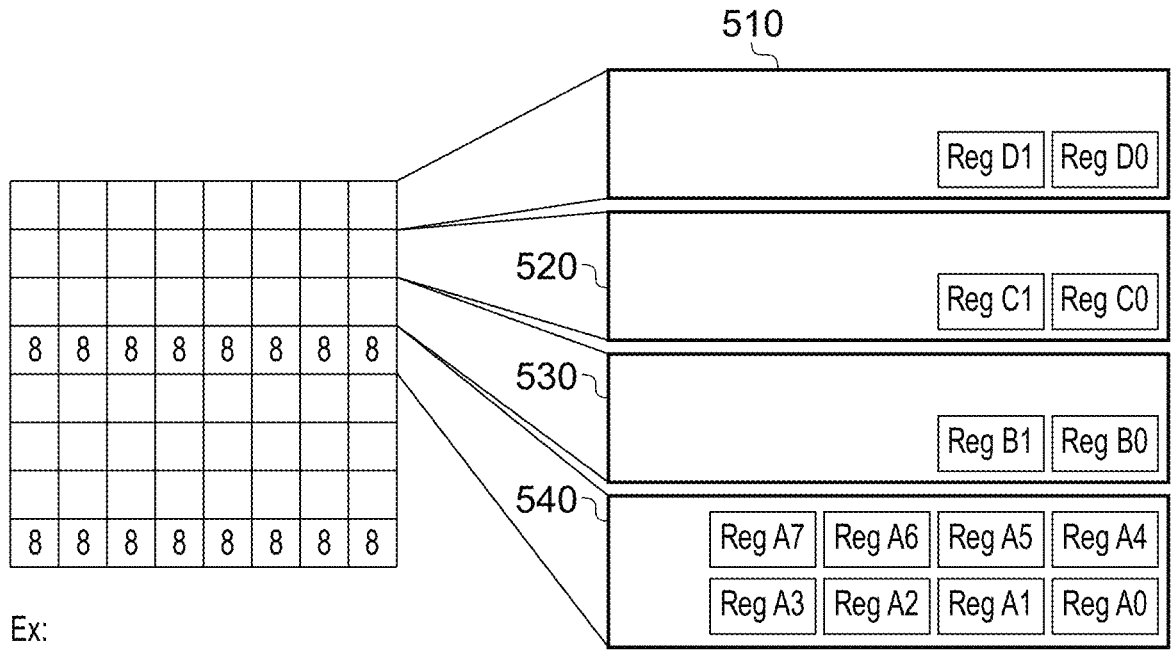
Figure 5C:
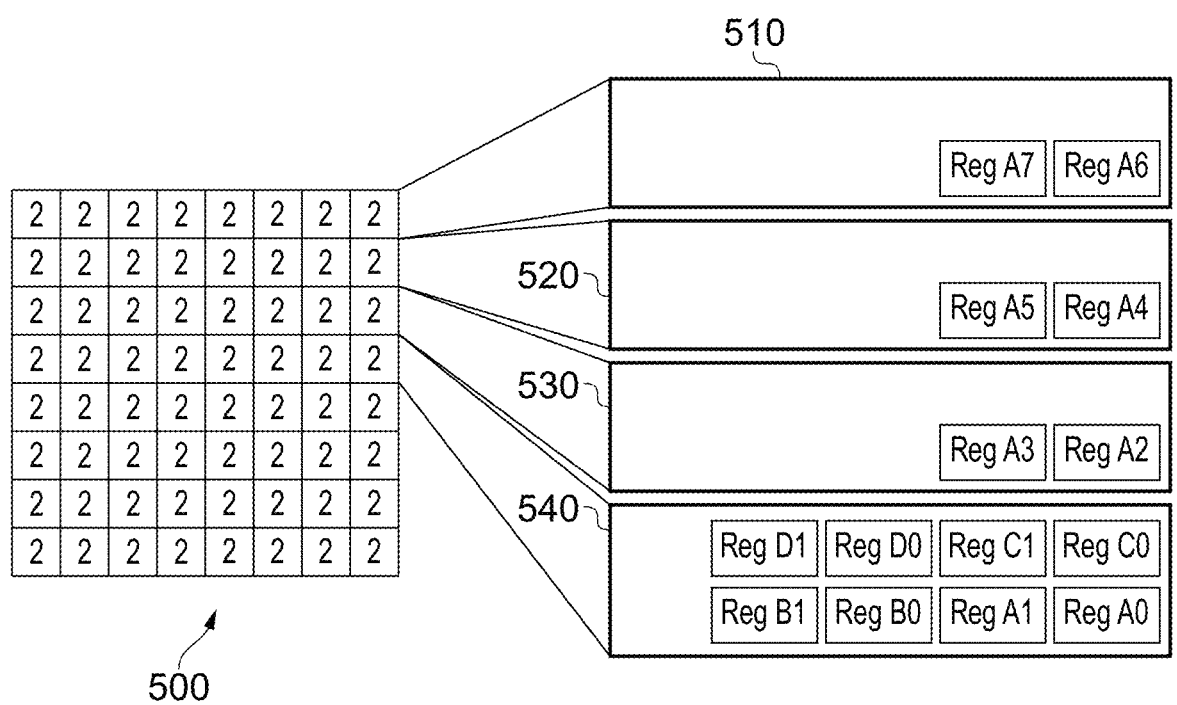

FIGS. 5A-5C illustrate a worked example where a register reorganisation procedure is performed to avoid micro-operation split. FIG. 5A illustrates a matrix processing unit 500 comprising 64 clusters. The top-right cluster 510 is shown in more detail on the right-side of FIG. 5A; however, it will be appreciated that a similar arrangement applies to each of the 64 clusters. The cluster 510 has four 32-bit execution units 502-508 for performing operations which output 32-bit results as well as 16 32-bit registers Reg0-Reg15 to store these results and data items used by the execution units to calculate the results. With this arrangement, forwarding circuitry is provided to connect each of the execution units 502-508 with the registers in the same cluster 510. However, the execution units cannot access registers located in different clusters.

FIG. 5B illustrates a particular instruction being executed by the matrix processing unit 500. The SMLALL instruction being handled by the matrix processing unit 500 involves operating on three 64-bit vectors Z0, Z1, and Z2. FIG. 5B also illustrates the logical registers to which certain physical registers in clusters 510-540 are mapped. For example, within cluster 510 at the top-right corner of the matrix, the first two physical registers are mapped to logical registers Reg D0 and Reg D1. In cluster 540, the eight depicted physical registers are mapped to logical registers Reg A0 to Reg A7. This mapping may be selected since it is particularly well-suited for a certain workload. However, it will be shown that this mapping is not optimised for the workload that is to be executed in this example.

For simplicity of illustration, only some physical registers are depicted in FIG. 5B.

To execute the SMLALL instruction, and considering only the top half of the right column of the matrix, the following operations need to be performed (corresponding operations will need to be performed in the bottom half and in the other columns):

Reg $A0[31:0]$=Reg $A0[31:0]+Z1[7:0]\times Z2[7:0]$

Reg $A1[31:0]$=Reg $A1[31:0]+Z1[15:8]\times Z2[15:8]$

Reg $A2[31:0]$=Reg $A2[31:0]+Z1[23:16]\times Z2[23:16]$

Reg $A3[31:0]$=Reg $A3[31:0]+Z1[31:24]\times Z2[31:24]$

Reg $A4[31:0]$=Reg $A4[31:0]+Z1[39:32]\times Z2[39:32]$

Reg $A5[31:0]$=Reg $A5[31:0]+Z1[47:40]\times Z2[47:40]$

Reg $A6[31:0]$=Reg $A6[31:0]+Z1[55:48]\times Z2[55:48]$

Reg $A7[31:0]$=Reg $A7[31:0]+Z1[63:56]\times Z2[63:56]$

In the list of operations above, references to Reg A0-Reg A7 refer to logical registers and Z1 and Z2 are 512-bit vector registers (which are not part of the matrix) but are accessible by the execution units. With the mapping shown in FIG. 5B, it can be seen that all of registers Reg A0-Reg A7 are mapped to physical registers in the cluster 540. As such, it is only the execution units within cluster 540 that are able to handle these operations. Consequently cluster 540 has eight operations to handle in order to carry out this instruction. This is illustrated in the depiction of the matrix 500 on the left-side of FIG. 5B in which the cluster 540 is illustrated with an eight.

Since the operations to be performed to carry out this instruction do not make use of the data in any of the physical registers associated with clusters 510, 520, 530 these clusters have no operations to perform.

The cluster 540 has only four execution units, as indicated in FIG. 5A, and so cannot handle all eight operations as a single micro-operation. Rather, execution of the instruction will be carried out using two micro-operations to allow the execution units of cluster 540 (and the corresponding execution units in the other columns and the bottom half of the matrix) to schedule the operations to commence on different cycles.

This micro-operation split leads to a performance impact since execution of the operation is delayed by executing the instruction as separate micro-operations. However, it can be seen from FIG. 5B that the need to perform the micro-operation split was driven by an uneven distribution of the operations across the clusters rather than a lack of available processing capacity. Indeed, most of the execution units in the matrix processing unit 500 are not used to carry out the operations in this example.

FIG. 5C illustrates an example where by using a different mapping between logical and physical registers, more efficient use of the available processing resources can be made. In this example, it is assumed that the register reorganisation circuitry 40 identifies the upcoming need for micro-operation split and changes the mapping between the logical and physical registers to prevent that split.

FIG. 5C illustrates the same matrix processing unit 500, but in this case the physical registers are now mapped to different logical registers. For example, the physical registers in cluster 510, which were previously mapped to logical registers Reg D0 and Reg D1 are now mapped to logical registers Reg A6 and Reg A7. Consequently, the execution units in cluster 510 are able to access the data stored in those physical registers corresponding to logical registers Reg A6 and Reg A7. Similarly, by distributing the data in logical registers A0-A7 more evenly across the clusters 510-540 as depicted in FIG. 5C, execution units across the different clusters are able to carry out the operations needed to execute the instruction.

For example, the following operations may now be performed in cluster 510 rather than cluster 540:

Reg $A6[31:0]$=Reg $A6[31:0]+Z1[55:48]\times Z2[55:48]$

Reg $A7[31:0]$=Reg $A7[31:0]+Z1[63:56]\times Z2[63:56]$

By remapping the registers in this way, the register reorganisation circuitry can redistribute the data more evenly across the clusters and thereby make use of more of the execution units to handle the operations. Now, where a similar analysis applies to each of the 64 clusters in the matrix, each cluster only needs to perform two operations. Since each cluster is provided with four execution units, this can be performed as a single micro-operation with no splitting. The instruction can therefore be executed in a more performant manner with this adjusted mapping.

Another way in which the register reorganisation procedure may be used is to make more efficient use of input operand storage as illustrated in the worked example of FIGS. 6A-6D.

Figure 6A:
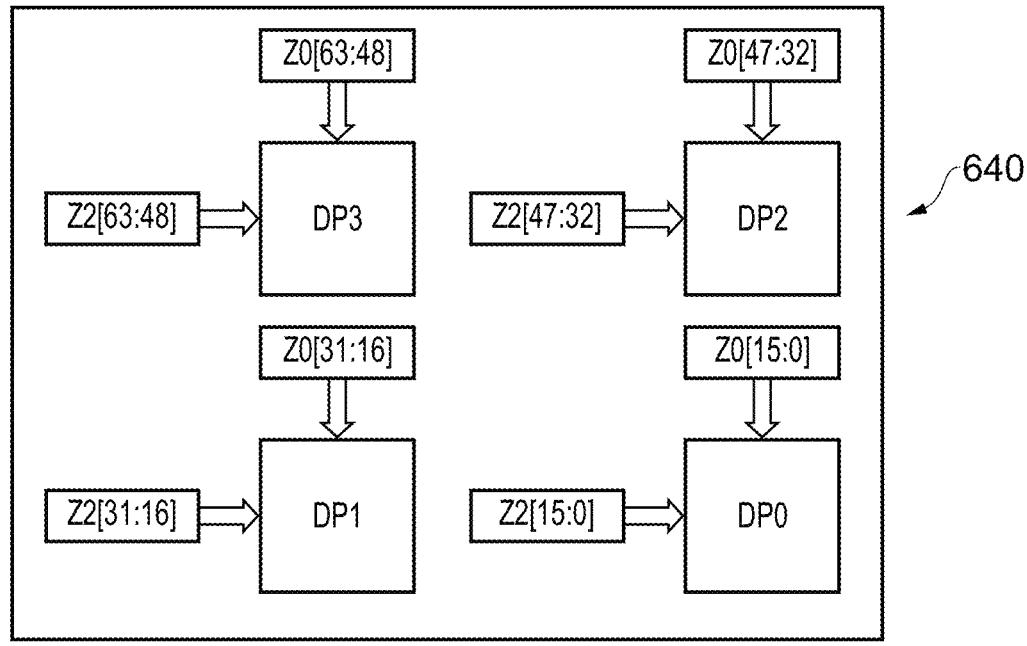
FIGS. 6A-6D illustrate a worked example where a register reorganisation procedure is performed to more efficiently make use of input operand storage.
Figure 6B:
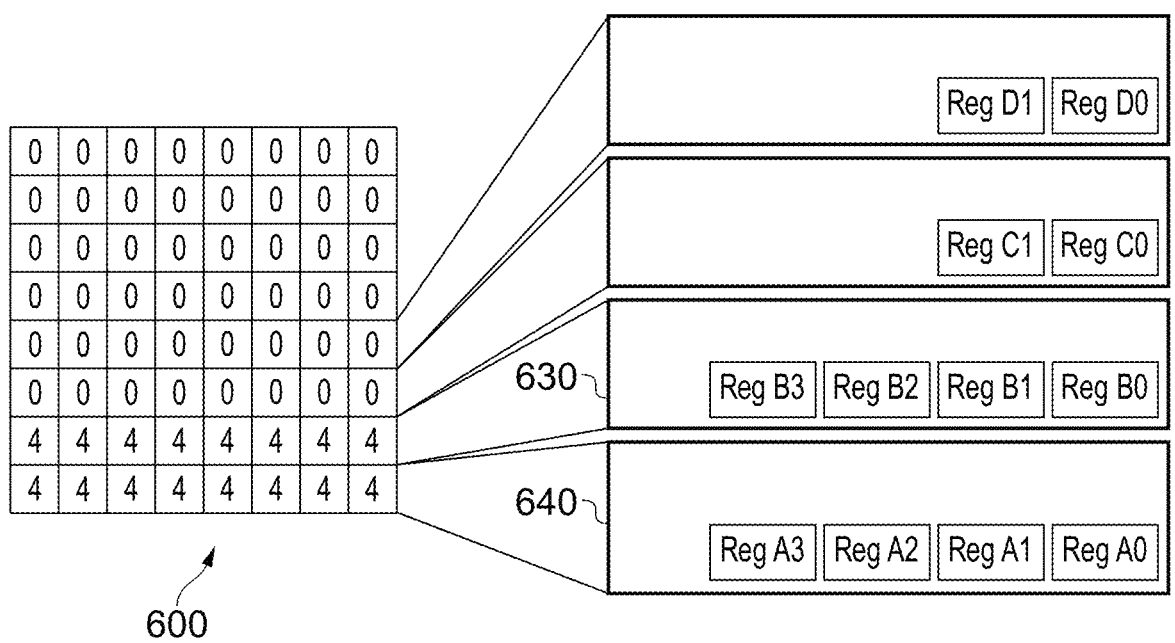

FIG. 6A illustrates the execution units DP0-DP3 of a cluster 640, e.g., of the form used in the matrix processing unit of FIGS. 5A-5C. Each execution unit DP0-DP3 is provided with input operand flops to store the operands used by the execution units. Here, the input operand flops are used to store data provided by the vector registers (outside the matrix) and input operand flops to store data from the registers in the same cluster are not shown.

These flops sit logically between the physical registers and the execution units to provide the data being used to execution units. As shown in FIG. 6A, execution unit DP0 makes use of two input operand flops. Similarly, each of execution units DP1-DP3 make use of two input operand flops. None of the flops used in cluster 640 store the same data and so there is no opportunity to use the same set of flops to provide a data item to more than one of the execution units. Thus, all eight input operand flops need to be used.

In this example, it is assumed that cluster 640 is to execute the following operations:

RegA0[31:0]=RegA0[31:0]+Z0[15:0]×Z2[15:0]

RegA1[31:0]=RegA1[31:0]+Z0[31:16]×Z2[31:16]

RegA2[31:0]=RegA2[31:0]+Z0[47:32]×Z2[47:32]

RegA3[31:0]=RegA3[31:0]+Z0[63:48]×Z2[63:48]

The input operand flops therefore store the corresponding values to be used from Z0 and Z2. It is assumed in this example that cluster 630, depicted in FIG. 6B executes the following operations:

RegB0[31:0]=RegB0[31:0]+Z1[15:0]×Z2[15:0]

RegB1[31:0]=RegB1[31:0]+Z1[31:16]×Z2[31:16]

RegB2[31:0]=RegB2[31:0]+Z1[47:32]×Z2[47:32]

RegB3[31:0]=RegB3[31:0]+Z1[63:48]×Z2[63:48]

It can be noted here that the first operation of each of these clusters uses Z2[15:0], the second operation in each of these clusters uses Z2[31:16] etc. If these pairs of operations could be handled by the same cluster, the input operand flop usage could be reduced since the same set of input operand flops could be used to store the common operands for access by multiple execution units.

Figure 6C:
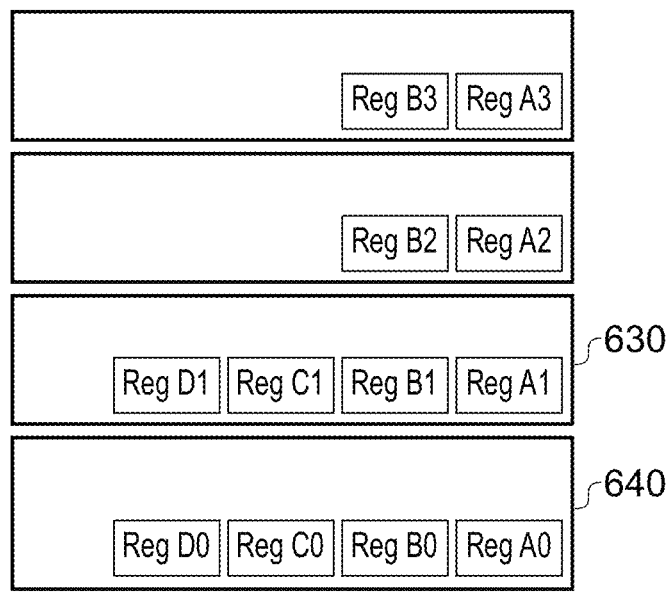

FIG. 6C illustrates a new mapping that may be used so as to allow the operations identified as being able to 'share' input operand flops to be executed within the same cluster. In this case therefore, Reg A0 and Reg A1 are both mapped to cluster 640. Consequently, the first operation from each of the above sets of operations can be executed by cluster 640. Cluster 640 therefore performs the following operations:

RegA0[31:0]=RegA0[31:0]+Z0[15:0]×Z2[15:0]

RegB0[31:-0]=RegB0[31:-0]+Z1[15:-0]×Z2[15:-0]

Similarly, cluster 630 now performs the operations:

RegA1[31:0]=RegA1[31:0]+Z0[31:16]×Z2[31:16]

RegB1[31:0]=RegB1[31:0]+Z1[31:16]×Z2[31:16]

Figure 6D:
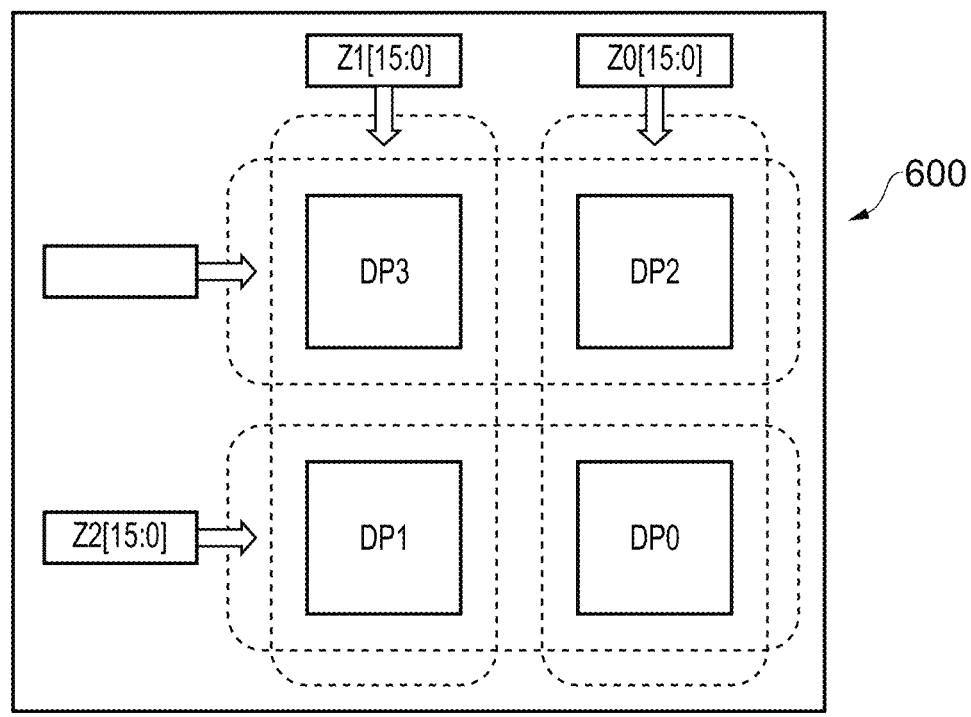

Hence, with the register reorganisation procedure having taken place to make use of the new mapping the input operand flops to provide Z2[15:0] in cluster 640 and Z2[31:16] in cluster 630 can be shared. This is illustrated in FIG. 6D where now only three input operand flops need to be used for two operations where before eight input operand flops were used to provide data to carry out four operations. This more efficient use of input operand flops allows the apparatus 2 to use less power since less power is consumed in operating the flops that no longer need to be used. This approach therefore provides another way in which reorganising the register can be used.

Thus there has been described techniques for register reorganisation where not all execution units provided as part of processing circuitry are able to access all of the registers storing data that they might need to make use of. By selectively adjusting the mapping between logical registers and physical registers based on the upcoming workload, the apparatus is able to make more efficient use of the available resources, executing workloads more quickly, saving power, and reducing the required processor area for performing forwarding.

The techniques described herein are illustrated with the following numbered examples.

Example 1. An apparatus comprising:

processing circuitry comprising at least two execution units configured to perform operations;

a plurality of physical registers to store data accessed by the execution units to perform the operations;

forwarding circuitry to forward the data from the physical registers to the execution units, wherein the forwarding circuitry provides an incomplete set of connections between the physical registers and the execution units such that, for each of at least some of the physical registers, the physical register is connected to only a subset of the execution units;

register renaming circuitry to map logical registers identified by the operations to respective physical registers of the plurality of physical registers; and register reorganisation circuitry configured to monitor upcoming operations to be performed by the processing circuitry and to determine, based on the upcoming operations and the connections provided by the forwarding circuitry, whether to perform a register reorganisation procedure to change a mapping between the logical registers and the physical registers used by the register renaming circuitry;

wherein the register reorganisation circuitry is configured to perform, in response to determining to perform the register reorganisation procedure, the register reorganisation procedure.

Example 2. The apparatus according to example 1, wherein:

the register reorganisation circuitry is configured to perform the register reorganisation procedure to avoid an upcoming operation of the upcoming operations being split into two or more micro-operations for execution by the processing circuitry.

Example 3. The apparatus according to example 2, wherein:
the register reorganisation circuitry is configured to make the determination to perform the register reorganisation procedure based on identifying that the mapping between the logical registers and the physical registers prevents the execution units performing the upcoming operation as a single micro-operation.

Example 4. The apparatus according to example 2 or example 3, wherein:
the register reorganisation circuitry is configured to make the determination to perform the register reorganisation procedure based on identifying that the connections provided by the forwarding circuitry do not connect the physical registers mapped to the particular logical registers identified by the upcoming operation to a subset of the execution units having sufficient bandwidth to execute the upcoming operation as a single micro-operation.

Example 5. The apparatus according to any of examples 2-4, wherein:
the register reorganisation circuitry is configured to perform the register reorganisation procedure to change the mapping to a new mapping that enables the upcoming operation to be performed as a single micro-operation.

Example 6. The apparatus according to example 5, wherein:
the new mapping maps particular logical registers identified by the upcoming operation to physical registers for which the forwarding circuitry provides connections to execution units having sufficient bandwidth to execute the upcoming operation as a single micro-operation.

Example 7. The apparatus according to any of examples 2-6, wherein:
the register reorganisation circuitry is responsive to identifying an upcoming operation that is due to be split into two or more micro-operations to perform the register reorganisation procedure.

Example 8. The apparatus according to any preceding example, wherein:
the processing circuitry comprises a plurality of clusters, each cluster comprising execution units of the at least two execution units and having corresponding physical registers of the plurality of physical registers associated therewith, wherein the forwarding circuitry provides connections between the physical registers and the execution units of the same cluster;
wherein the register reorganisation circuitry is configured to perform the register reorganisation procedure to reallocate logical registers mapped to particular physical registers associated with a particular cluster to different physical registers associated with a different cluster; and
wherein reallocating the logical registers to the different physical registers associated with the different cluster enables operations identifying the logical registers to be performed by the execution units of the different cluster.

Example 9. The apparatus according to any preceding example, wherein:
the register reorganisation circuitry is configured to perform the register reorganisation procedure in response to determining that changing the mapping between the logical registers and the physical registers would save power when the processing circuitry executes the upcoming instructions.

Example 10. The apparatus according to any preceding example, wherein:
the processing circuitry comprises input operand storage circuitry comprising one or more operand storage elements configured to store input operands for the operations to be accessed by respective execution units, wherein for at least some of the one or more operand storage elements, each of the operand storage elements is accessible by more than one execution unit; and
the register reorganisation circuitry is configured to perform the register reorganisation procedure in response to determining that the usage of the input operand storage circuitry can be reduced by changing the mapping between the logical registers and the physical registers.

Example 11. The apparatus according to example 10, wherein:
the register reorganisation circuitry is configured to perform the register reorganisation procedure to allocate logical registers storing data that is to be used by more than one execution unit to physical registers from which an operand storage element accessible by more than one execution unit can be used to provide the data to the more than one execution units.

Example 12. The apparatus according to any of examples 9-11, wherein:
the register reorganisation circuitry is configured to perform the register reorganisation procedure in response to determining that the power saved by changing the mapping between the logical registers and the physical registers exceeds a power consumption associated with performing the register reorganisation procedure.

Example 13. The apparatus according to example 12, wherein:
the register reorganisation circuitry is configured to perform the register reorganisation procedure in response to identifying a threshold number of consecutive operations for which changing the mapping to a particular new mapping would reduce the power consumed in performing those operations.

Example 14. The apparatus according to any preceding example, wherein:
the register reorganisation circuitry is arranged to select between a set of predetermined mappings between the logical registers and the physical registers.

Example 15. The apparatus according to any preceding example, wherein to perform the register reorganisation procedure, the register reorganisation circuitry is configured to:
halt upcoming operations while operations being executed by the processing circuitry finish executing;
transfer data between physical registers of the plurality of physical registers to structure the data according to a new mapping between the logical registers and the physical registers; and
cause the register renaming circuitry to map the logical registers to the respective physical registers according to the new mapping.

Example 16. The apparatus according to any preceding example, wherein:
the set of connections between the physical registers and the execution units provided by the forwarding circuitry are optimised for executing a particular type of operation.

Example 17. The apparatus according to example 16, wherein:
the particular type of operation is an outer product operation between two vectors.

Example 18. The apparatus according to any preceding example, wherein:
the apparatus comprises issue circuitry to buffer the upcoming operations; and
the register reorganisation circuitry is configured to monitor the upcoming operations held in the issue circuitry.

Example 19. The apparatus according to any preceding example, wherein:
the processing circuitry comprises matrix processing circuitry.

Example 20. The apparatus according to any preceding example, wherein:
the processing circuitry comprises vector processing circuitry.

Example 21. A method comprising:
performing, by processing circuitry comprising at least two execution units, operations;
storing, by a plurality of physical registers, data accessed by the execution units to perform the operations;
forwarding the data from the physical registers to the execution units over an incomplete set of connections between the physical registers and the execution units such that, for each of at least some of the physical registers, the physical register is connected to only a subset of the execution units;
mapping logical registers identified by the operations to respective physical registers of the plurality of physical registers; and
monitoring upcoming operations to be performed by the processing circuitry and determining, based on the upcoming operations whether to perform a register reorganisation procedure to change a mapping between the logical registers and the physical registers;
performing, in response to determining to perform the register reorganisation procedure, the register reorganisation procedure.

Example 22. A non-transitory computer-readable medium to store computer-readable code for fabrication of an apparatus comprising:
processing circuitry comprising at least two execution units configured to perform operations;
a plurality of physical registers to store data accessed by the execution units to perform the operations;
forwarding circuitry to forward the data from the physical registers to the execution units, wherein the forwarding circuitry provides an incomplete set of connections between the physical registers and the execution units such that, for each of at least some of the physical registers, the physical register is connected to only a subset of the execution units;
register renaming circuitry to map logical registers identified by the operations to respective physical registers of the plurality of physical registers; and
register reorganisation circuitry configured to monitor upcoming operations to be performed by the processing circuitry and to determine, based on the upcoming operations and the connections provided by the forwarding circuitry, whether to perform a register reorganisation procedure to change a mapping between the logical registers and the physical registers used by the register renaming circuitry;
wherein the register reorganisation circuitry is configured to perform, in response to determining to perform the register reorganisation procedure, the register reorganisation procedure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
hardware processing circuitry comprising execution units configured to perform operations;
a plurality of physical registers to store data accessed by the execution units to perform the operations;
forwarding circuitry to forward the data from the physical registers to the execution units, wherein the forwarding circuitry provides an incomplete set of connections between the physical registers and the execution units such that, for each of at least some of the physical registers, the physical register is connected to a proper subset of the execution units;
register renaming circuitry to map logical registers identified by the operations to respective physical registers of the plurality of physical registers; and
register reorganisation circuitry configured to monitor upcoming operations to be performed by the hardware processing circuitry and to determine, based on the upcoming operations and the incomplete set of connections provided by the forwarding circuitry, whether to perform a register reorganisation procedure to change a mapping between the logical registers and the respective physical registers;
wherein the register reorganisation circuitry is configured to perform, in response to determining to perform the register reorganisation procedure, the register reorganisation procedure.

2. The apparatus according to claim 1, wherein:
the register reorganisation circuitry is configured to perform the register reorganisation procedure to avoid an upcoming operation of the upcoming operations being split into two or more micro-operations for execution by the hardware processing circuitry.

3. The apparatus according to claim 2, wherein:
the register reorganisation circuitry is configured to make the determination to perform the register reorganisation procedure based on identifying that the mapping between the logical registers and the physical registers prevents one of the execution units performing the upcoming operation as a single micro-operation.

4. The apparatus according to claim 2, wherein:
the register reorganisation circuitry is configured to make the determination to perform the register reorganisation procedure based on identifying that the incomplete set of_connections provided by the forwarding circuitry do not connect one or more of the physical registers mapped to one or more of the logical registers identified by the upcoming operation to a subset of the execution units, the subset having sufficient bandwidth to execute the upcoming operation as a single micro-operation.

5. The apparatus according to claim 2, wherein:
the register reorganisation circuitry is configured to perform the register reorganisation procedure to change the mapping to a new mapping that enables the upcoming operation to be performed as a single micro-operation.

6. The apparatus according to claim 5, wherein:
the new mapping maps particular logical registers identified by the upcoming operation to physical registers for which the forwarding circuitry provides connections to execution units having sufficient bandwidth to execute the upcoming operation as a single micro-operation.

7. The apparatus according to claim 2, wherein:
the register reorganisation circuitry is responsive to identifying an upcoming operation that is due to be split into two or more micro-operations to perform the register reorganisation procedure.

8. The apparatus according to claim 1, wherein:
the hardware processing circuitry comprises a plurality of clusters, each cluster comprising some of the execution units and having corresponding physical registers of the plurality of physical registers, wherein the forwarding circuitry provides the incomplete set of connections between the physical registers and the execution units of the same cluster;
wherein the register reorganisation circuitry is configured to perform the register reorganisation procedure to reallocate one or more logical registers mapped to particular physical registers associated with a particular cluster to different physical registers associated with a different cluster of the plurality of clusters; and
wherein reallocating the one or more logical registers to the different physical registers associated with the different cluster enables operations identifying the logical registers to be performed by the execution units of the different cluster.

9. The apparatus according to claim 1, wherein:
the register reorganisation circuitry is configured to perform the register reorganisation procedure in response to determining that changing the mapping between the logical registers and the physical registers would save power when the hardware processing circuitry executes the upcoming operations.

10. The apparatus according to claim 9, wherein:
the register reorganisation circuitry is configured to perform the register reorganisation procedure in response to determining that the power saved by changing the mapping between the logical registers and the physical registers exceeds a power consumption associated with performing the register reorganisation procedure.

11. The apparatus according to claim 10, wherein:
the register reorganisation circuitry is configured to perform the register reorganisation procedure in response to identifying a threshold number of consecutive operations for which changing the mapping to a particular new mapping would reduce the power consumed in performing the consecutive operations.

12. The apparatus according to claim 1, wherein:
the hardware processing circuitry comprises input operand storage circuitry comprising one or more operand storage elements configured to store input operands for operations to be accessed by respective execution units, wherein for at least some of the one or more operand storage elements, each operand storage elements is accessible by more than one execution unit; and
the register reorganisation circuitry is configured to perform the register reorganisation procedure in response to determining that usage of the input operand storage circuitry can be reduced by changing the mapping between the logical registers and the physical registers.

13. The apparatus according to claim 12, wherein:
the register reorganisation circuitry is configured to perform the register reorganisation procedure to allocate logical registers storing shared data that is to be used by more than one execution unit to physical registers from which an operand storage element accessible by the more than one execution unit can be used to provide the shared data to the more than one execution units.

14. The apparatus according to claim 1, wherein:
the register reorganisation circuitry is arranged to select between a set of predetermined mappings between the logical registers and the physical registers.

15. The apparatus according to claim 1, wherein to perform the register reorganisation procedure, the register reorganisation circuitry is configured to:
halt upcoming operations while operations being executed by the hardware processing circuitry finish executing;
transfer the data between the physical registers to structure the data according to a new mapping between the logical registers and the respective physical registers; and
cause the register renaming circuitry to map the logical registers to the respective physical registers according to the new mapping.

16. The apparatus according to claim 1, wherein:
the incomplete set of connections between the physical registers and the execution units provided by the forwarding circuitry are optimised for executing a particular type of operation.

17. The apparatus according to claim 1, wherein:
the apparatus comprises issue circuitry to buffer the upcoming operations; and
the register reorganisation circuitry is configured to monitor the upcoming operations held in the issue circuitry.

18. The apparatus according to claim 1, wherein:
the hardware processing circuitry comprises matrix processing circuitry.

19. A method comprising:
performing, by processing circuitry comprising execution units, operations;
storing, by a plurality of physical registers, data accessed by the execution units to perform the operations;
forwarding the data from the physical registers to the execution units over an incomplete set of connections between the physical registers and the execution units such that, for each of at least some of the physical registers, the physical register is connected to a proper subset of the execution units;
mapping logical registers identified by the operations to respective physical registers of the plurality of physical registers; and
monitoring upcoming operations to be performed by the processing circuitry and determining, based on the upcoming operations and the incomplete set of connections, whether to perform a register reorganisation procedure to change a mapping between the logical registers and the physical registers;

performing, in response to determining to perform the register reorganisation procedure, the register reorganisation procedure.

20. A non-transitory computer-readable medium to store computer-readable code for fabrication of an apparatus comprising:

processing circuitry comprising execution units configured to perform operations;

a plurality of physical registers to store data accessed by the execution units to perform the operations;

forwarding circuitry to forward the data from the physical registers to the execution units, wherein the forwarding circuitry provides an incomplete set of connections between the physical registers and the execution units such that, for each of at least some of the physical registers, the physical register is connected to a proper subset of the execution units;

register renaming circuitry to map logical registers identified by the operations to respective physical registers of the plurality of physical registers; and register reorganisation circuitry configured to monitor upcoming operations to be performed by the processing circuitry and to determine, based on the upcoming operations and the incomplete set of connections provided by the forwarding circuitry, whether to perform a register reorganisation procedure to change a mapping between the logical registers and the respective physical registers;

wherein the register reorganisation circuitry is configured to perform, in response to determining to perform the register reorganisation procedure, the register reorganisation procedure.

* * * * *